US008326703B2

(12) United States Patent
Peter et al.

(10) Patent No.: US 8,326,703 B2
(45) Date of Patent: Dec. 4, 2012

(54) ARCHITECTURAL DESIGN FOR PRODUCT CATALOG MANAGEMENT APPLICATION SOFTWARE

(75) Inventors: Markus Peter, St. Leon-Rot (DE); Jens Freund, Heidelberg (DE); Stefan Kaetker, Dossenheim (DE); Gerd Moosmann, Pforzheim (DE); Peter Latocha, Malsch (DE)

(73) Assignee: SAP AG, Walldorf (DE)

( * ) Notice: Subject to any disclaimer, the term of this patent is extended or adjusted under 35 U.S.C. 154(b) by 1275 days.

(21) Appl. No.: 11/323,634

(22) Filed: Dec. 30, 2005

(65) Prior Publication Data
US 2007/0156538 A1   Jul. 5, 2007

(51) Int. Cl.
G06Q 30/00 (2006.01)
(52) U.S. Cl. .................................. 705/27.1; 705/26.1
(58) Field of Classification Search ............ 705/26, 705/27
See application file for complete search history.

(56) References Cited

U.S. PATENT DOCUMENTS

| | | | |
|---|---|---|---|
| 4,947,321 A | 8/1990 | Spence et al. | |
| 5,361,198 A | 11/1994 | Harmon et al. | |
| 5,550,734 A | 8/1996 | Tarter et al. | |
| 5,560,005 A | 9/1996 | Hoover et al. | |
| 5,556,097 A | 10/1996 | Myers et al. | |
| 5,586,312 A | 12/1996 | Johnson et al. | |
| 5,590,277 A | 12/1996 | Fuchs et al. | |
| 5,632,022 A | 5/1997 | Warren et al. | |
| 5,634,127 A | 5/1997 | Cloud et al. | |
| 5,680,619 A | 10/1997 | Gudmundson et al. | |
| 5,704,044 A | 12/1997 | Tarter et al. | |
| 5,710,917 A | 1/1998 | Musa et al. | |
| 5,768,119 A | 6/1998 | Havekost et al. | |
| 5,822,585 A | 10/1998 | Noble et al. | |
| 5,832,218 A | 11/1998 | Gibbs et al. | |
| 5,848,291 A | 12/1998 | Milne et al. | |

(Continued)

FOREIGN PATENT DOCUMENTS
WO    00/23874    4/2000
(Continued)

OTHER PUBLICATIONS

Beisiegel, M. et al., "Service Component Architecture: Building Systems using a Service Oriented Architecture", Whitepaper [Online], (Nov. 2005), pp. 1-31. Retrieved from the Internet: <URL: http://download.boulder.ibm.com/ibmdl/pub/software/dw/specs/ws-sca/SCA_White_Paper1_09.pdf> [retrieved on Mar. 22, 2007].

(Continued)

*Primary Examiner* — Robert M. Pond
(74) *Attorney, Agent, or Firm* — Fish & Richardson P.C.

(57) ABSTRACT

Methods, systems, and apparatus, including computer program products, for implementing a software architecture design for a software application implementing catalog management useful to create or update published catalogs based on product master data changes or external supplier catalogs. The application is structured as multiple process components interacting with each other through service interfaces, and multiple service interface operations, each being implemented for a respective process component. The process components include a Purchasing Contract Processing process component that handles agreements between a purchaser and a supplier; a Product Catalogue Authoring process component that creates and edits product catalogs by collecting product information from relevant sources, controls the quality of the product catalogs' contents, and controls when and to what extent Product Catalogues can be published; and a Product Catalogue Publishing process component that makes published product catalogs available to a large number of users electronically for use in other business processes.

16 Claims, 6 Drawing Sheets

U.S. PATENT DOCUMENTS

| | | | |
|---|---|---|---|
| 5,867,495 | A | 2/1999 | Elliott et al. |
| 5,870,588 | A | 2/1999 | Rompaey et al. |
| 5,881,230 | A | 3/1999 | Christensen et al. |
| 5,893,106 | A | 4/1999 | Brobst et al. |
| 5,898,872 | A | 4/1999 | Richley |
| 5,918,219 | A | 6/1999 | Isherwood |
| 5,987,247 | A | 11/1999 | Lau |
| 5,991,536 | A | 11/1999 | Brodsky et al. |
| H1830 | H | 1/2000 | Petrimoulx et al. |
| 6,028,997 | A | 2/2000 | Leymann et al. |
| 6,038,393 | A | 3/2000 | Iyengar et al. |
| 6,049,838 | A | 4/2000 | Miller et al. |
| 6,067,559 | A | 5/2000 | Allard et al. |
| 6,070,197 | A | 5/2000 | Cobb et al. |
| 6,112,024 | A | 8/2000 | Almond et al. |
| 6,151,582 | A | 11/2000 | Huang et al. |
| 6,167,563 | A | 12/2000 | Fontana et al. |
| 6,167,564 | A | 12/2000 | Fontana et al. |
| 6,177,932 | B1 | 1/2001 | Galdes et al. |
| 6,182,133 | B1 | 1/2001 | Horvitz |
| 6,192,390 | B1 | 2/2001 | Berger et al. |
| 6,208,345 | B1 | 3/2001 | Sheard et al. |
| 6,237,136 | B1 | 5/2001 | Sadhiro |
| 6,272,672 | B1 | 8/2001 | Conway |
| 6,311,170 | B1 | 10/2001 | Embrey |
| 6,338,097 | B1 | 1/2002 | Krenzke et al. |
| 6,424,991 | B1 | 7/2002 | Gish |
| 6,434,740 | B1 | 8/2002 | Monday et al. |
| 6,442,748 | B1 | 8/2002 | Bowman-Amuah |
| 6,445,782 | B1 | 9/2002 | Elfe et al. |
| 6,446,045 | B1 | 9/2002 | Stone et al. |
| 6,446,092 | B1 | 9/2002 | Sutter |
| 6,473,794 | B1 | 10/2002 | Guheen et al. |
| 6,493,716 | B1 | 12/2002 | Azagury et al. |
| 6,571,220 | B1 | 5/2003 | Ogino et al. |
| 6,594,535 | B1 | 7/2003 | Constanza |
| 6,601,233 | B1 | 7/2003 | Underwood |
| 6,601,234 | B1 | 7/2003 | Bowman-Amuah |
| 6,606,744 | B1 | 8/2003 | Mikurak |
| 6,609,100 | B2 | 8/2003 | Smith et al. |
| 6,640,238 | B1 | 10/2003 | Bowman-Amuah |
| 6,671,673 | B1 | 12/2003 | Baseman et al. |
| 6,678,882 | B1 | 1/2004 | Hurley et al. |
| 6,687,734 | B1 | 2/2004 | Sellink et al. |
| 6,691,151 | B1 | 2/2004 | Cheyer et al. |
| 6,721,783 | B1 | 4/2004 | Blossman et al. |
| 6,738,964 | B1 | 5/2004 | Zink et al. |
| 6,747,679 | B1 | 6/2004 | Finch et al. |
| 6,750,885 | B1 | 6/2004 | Finch et al. |
| 6,757,837 | B1 | 6/2004 | Platt et al. |
| 6,764,009 | B2 | 7/2004 | Melick et al. |
| 6,772,216 | B1 | 8/2004 | Ankireddipally et al. |
| 6,782,536 | B2 | 8/2004 | Moore et al. |
| 6,789,252 | B1 | 9/2004 | Burke et al. |
| 6,845,499 | B2 | 1/2005 | Srivastava et al. |
| 6,847,854 | B2 | 1/2005 | Discenzo |
| 6,859,931 | B1 | 2/2005 | Cheyer et al. |
| 6,889,197 | B2 | 5/2005 | Lidow |
| 6,889,375 | B1 | 5/2005 | Chan et al. |
| 6,895,438 | B1 | 5/2005 | Ulrich |
| 6,898,783 | B1 | 5/2005 | Gupta et al. |
| 6,904,399 | B2 | 6/2005 | Cooper et al. |
| 6,907,395 | B1 | 6/2005 | Hunt et al. |
| 6,954,736 | B2 | 10/2005 | Menninger et al. |
| 6,985,939 | B2 | 1/2006 | Fletcher et al. |
| 6,990,466 | B1 | 1/2006 | Hu |
| 7,003,474 | B2 | 2/2006 | Lidow |
| 7,031,998 | B2 | 4/2006 | Archbold |
| 7,043,448 | B2 | 5/2006 | Campbell |
| 7,047,518 | B2 | 5/2006 | Little et al. |
| 7,050,056 | B2 | 5/2006 | Meyringer |
| 7,050,873 | B1 | 5/2006 | Discenzo |
| 7,055,136 | B2 | 5/2006 | Dzoba et al. |
| 7,058,587 | B1 | 6/2006 | Horne |
| 7,069,536 | B2 | 6/2006 | Yaung |
| 7,072,855 | B1 | 7/2006 | Godlewski et al. |
| 7,076,766 | B2 | 7/2006 | Wirts et al. |
| 7,100,195 | B1 | 8/2006 | Underwood |
| 7,103,873 | B2 | 9/2006 | Tanner et al. |
| 7,117,447 | B2 | 10/2006 | Cobb et al. |
| 7,120,597 | B1 | 10/2006 | Knudtzon et al. |
| 7,120,896 | B2 | 10/2006 | Budhiraja et al. |
| 7,131,069 | B1 | 10/2006 | Rush et al. |
| 7,149,887 | B2 | 12/2006 | Morrison et al. |
| 7,155,403 | B2 | 12/2006 | Cirulli et al. |
| 7,155,409 | B1 | 12/2006 | Stroh |
| 7,181,694 | B2 | 2/2007 | Reiss et al. |
| 7,184,964 | B2 | 2/2007 | Wang |
| 7,194,431 | B1 | 3/2007 | Land et al. |
| 7,197,740 | B2 | 3/2007 | Beringer et al. |
| 7,200,569 | B2 | 4/2007 | Gallagher et al. |
| 7,206,768 | B1 | 4/2007 | deGroeve et al. |
| 7,213,232 | B1 | 5/2007 | Knowles |
| 7,216,091 | B1 | 5/2007 | Blandina et al. |
| 7,219,107 | B2 | 5/2007 | Beringer |
| 7,222,786 | B2 | 5/2007 | Renz et al. |
| 7,225,240 | B1 | 5/2007 | Fox et al. |
| 7,249,044 | B2 | 7/2007 | Kumar et al. |
| 7,257,254 | B2 | 8/2007 | Tunney |
| 7,283,973 | B1 | 10/2007 | Loghmani et al. |
| 7,293,254 | B2 | 11/2007 | Bloesch et al. |
| 7,299,970 | B1 | 11/2007 | Ching |
| 7,315,830 | B1 | 1/2008 | Wirtz et al. |
| 7,322,024 | B2 | 1/2008 | Carlson et al. |
| 7,324,966 | B2 | 1/2008 | Scheer |
| 7,353,180 | B1 | 4/2008 | Silverstone et al. |
| 7,356,492 | B2 | 4/2008 | Hazi et al. |
| 7,367,011 | B2 | 4/2008 | Ramsey et al. |
| 7,370,315 | B1 | 5/2008 | Lovell et al. |
| 7,376,601 | B1 | 5/2008 | Aldridge |
| 7,376,604 | B1 | 5/2008 | Butcher |
| 7,376,632 | B1 | 5/2008 | Sadek et al. |
| 7,383,201 | B2 | 6/2008 | Matsuzaki et al. |
| 7,386,833 | B2 | 6/2008 | Granny et al. |
| 7,406,716 | B2 | 7/2008 | Kanamori et al. |
| 7,415,697 | B1 | 8/2008 | Houlding |
| 7,418,409 | B1 | 8/2008 | Goel |
| 7,418,424 | B2 | 8/2008 | Martin et al. |
| 7,424,701 | B2 | 9/2008 | Kendall et al. |
| 7,433,979 | B2 | 10/2008 | Need |
| 7,448,022 | B1 | 11/2008 | Ram et al. |
| 7,451,432 | B2 | 11/2008 | Shukla et al. |
| 7,460,654 | B1 | 12/2008 | Jenkins et al. |
| 7,461,030 | B2 | 12/2008 | Hibler et al. |
| 7,469,233 | B2 | 12/2008 | Shooks et al. |
| 7,516,088 | B2 | 4/2009 | Johnson et al. |
| 7,523,054 | B2 | 4/2009 | Tyson-Quah |
| 7,529,699 | B2 | 5/2009 | Fuse et al. |
| 7,536,325 | B2 | 5/2009 | Randell et al. |
| 7,536,354 | B1 | 5/2009 | deGroeve et al. |
| 7,546,520 | B2 | 6/2009 | Davidson et al. |
| 7,546,575 | B1 | 6/2009 | Dillman et al. |
| 7,565,640 | B2 | 7/2009 | Shukla et al. |
| 7,574,694 | B2 | 8/2009 | Mangan et al. |
| 7,624,371 | B2 | 11/2009 | Kulkarni et al. |
| 7,631,291 | B2 | 12/2009 | Shukla et al. |
| 7,640,195 | B2 | 12/2009 | Von Zimmermann et al. |
| 7,640,291 | B2 | 12/2009 | Maturana et al. |
| 7,644,390 | B2 | 1/2010 | Khodabandehloo et al. |
| 7,657,406 | B2 | 2/2010 | Tolone et al. |
| 7,657,445 | B1 | 2/2010 | Goux |
| 7,665,083 | B2 | 2/2010 | Demant et al. |
| 7,668,761 | B2 | 2/2010 | Jenkins et al. |
| 7,672,888 | B2 | 3/2010 | Allin et al. |
| 7,681,176 | B2 | 3/2010 | Willis et al. |
| 7,693,586 | B2 | 4/2010 | Dumas et al. |
| 7,703,073 | B2 | 4/2010 | Illowsky et al. |
| 7,739,160 | B1 | 6/2010 | Ryan et al. |
| 7,742,985 | B1 | 6/2010 | Digrigoli et al. |
| 7,747,980 | B2 | 6/2010 | Illowsky et al. |
| 7,765,156 | B2 | 7/2010 | Staniar et al. |
| 7,765,521 | B2 | 7/2010 | Bryant |
| 7,788,145 | B2 | 8/2010 | Wadawadigi et al. |
| 7,788,319 | B2 | 8/2010 | Schmidt |
| 7,793,256 | B2 | 9/2010 | Charisius et al. |
| 7,793,258 | B2 | 9/2010 | Sundararajan et al. |
| 7,797,698 | B2 | 9/2010 | Diament et al. |

| Patent/Publication | Date | Inventors |
|---|---|---|
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,010,938 B2 | 8/2011 | Elaasar |
| 8,051,332 B2 | 11/2011 | Zakonov et al. |
| 8,091,065 B2 | 1/2012 | Mir et al. |
| 8,112,738 B2 | 2/2012 | Pohl et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1* | 8/2002 | Bowman-Amuah ............ 705/37 |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1* | 10/2002 | Edwards ......................... 705/26 |
| 2002/0161907 A1 | 10/2002 | Moon |
| 2002/0184111 A1* | 12/2002 | Swanson ......................... 705/26 |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2009/0192858 A1 | 7/2006 | Johnson |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0164849 A1 | 7/2007 | Haeberle et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |

| | | | |
|---|---|---|---|
| 2007/0198391 A1 | 8/2007 | Dreyer et al. | |
| 2007/0214065 A1 | 9/2007 | Kahlon et al. | |
| 2007/0220046 A1 | 9/2007 | Moosmann et al. | |
| 2007/0220143 A1 | 9/2007 | Lund et al. | |
| 2007/0233539 A1 | 10/2007 | Suenderhauf et al. | |
| 2007/0233541 A1 | 10/2007 | Schorr et al. | |
| 2007/0233545 A1 | 10/2007 | Cala et al. | |
| 2007/0233574 A1 | 10/2007 | Koegler et al. | |
| 2007/0233575 A1 | 10/2007 | Berger et al. | |
| 2007/0233581 A1 | 10/2007 | Peter | |
| 2007/0233598 A1 | 10/2007 | Der Emde et al. | |
| 2007/0234282 A1 | 10/2007 | Prigge et al. | |
| 2007/0239508 A1 | 10/2007 | Fazal et al. | |
| 2007/0239569 A1 | 10/2007 | Lucas et al. | |
| 2007/0265860 A1 | 11/2007 | Herrmann et al. | |
| 2007/0265862 A1 | 11/2007 | Freund et al. | |
| 2008/0004929 A9 | 1/2008 | Raffel et al. | |
| 2008/0017722 A1 | 1/2008 | Snyder et al. | |
| 2008/0027831 A1 | 1/2008 | Gerhardt | |
| 2008/0065437 A1 | 3/2008 | Dybvig | |
| 2008/0120129 A1 | 5/2008 | Seubert et al. | |
| 2008/0147507 A1 | 6/2008 | Langhammer | |
| 2008/0162382 A1 | 7/2008 | Clayton et al. | |
| 2008/0208707 A1 | 8/2008 | Erbey et al. | |
| 2008/0215354 A1 | 9/2008 | Halverson et al. | |
| 2008/0263152 A1 | 10/2008 | Daniels et al. | |
| 2008/0300959 A1 | 12/2008 | Sinha et al. | |
| 2009/0037287 A1 | 2/2009 | Baitalmal et al. | |
| 2009/0037492 A1 | 2/2009 | Baitalmal et al. | |
| 2009/0063112 A1 | 3/2009 | Hader et al | |
| 2009/0171716 A1 | 7/2009 | Suenderhauf et al. | |
| 2009/0171818 A1 | 7/2009 | Penning et al. | |
| 2009/0172699 A1 | 7/2009 | Jungkind et al. | |
| 2009/0189743 A1 | 7/2009 | Abraham et al. | |
| 2010/0070324 A1 | 3/2010 | Bock et al. | |
| 2010/0070331 A1 | 3/2010 | Koegler et al. | |
| 2010/0070336 A1 | 3/2010 | Koegler et al. | |
| 2010/0070395 A1 | 3/2010 | Elkeles et al. | |
| 2010/0070555 A1 | 3/2010 | Duparc et al. | |
| 2010/0100464 A1 | 4/2010 | Ellis et al. | |
| 2010/0138269 A1 | 6/2010 | Cirpus et al. | |
| 2011/0252395 A1 | 10/2011 | Charisius et al. | |

FOREIGN PATENT DOCUMENTS

| | | |
|---|---|---|
| WO | WO 2004/083984 | 9/2004 |
| WO | WO 2005/114381 | 12/2005 |

OTHER PUBLICATIONS

Ferguson, D.F. et al., "Service-oriented architecture: Programming model and product architecture", *IBM Systems Journal* [online], vol. 44, No. 4 (Dec. 1, 2005), pp. 753-779. Retrieved from the Internet: http://researchweb.watson.ibm.com/journal/sj/444/ferguson.pdf [retrieved on Mar. 22, 2007].

SAP AG, International Search Report of PCT/EP2006/012618 filed on Dec. 29, 2006.

Stojanovic, Z. et al., "Modeling and design of service-oriented architecture", Systems, Man and Cybernetics, 2004 IEEE International Conference on the Hague, The Netherlands held on Oct. 10-13, 2004, Piscataway, NJ, USA, IEEE, vol. 5 (Oct. 10, 2004), pp. 4147-4152.

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docs/VCAB_datasheet.pdf.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
"American Software Announces ASP Pricing Model for It's a-Applications Expense Business Solution"; PR Newswire; Mar. 6, 2000; 2 pages.
Anon.; "Sequent Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports 13,000 MAS 90 for WINDOWS Shipments in First Nine Months of Availability"; PR Newswire; Apr. 28, 1997.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyers' Guide to Software for Purchasing 2000.(Directory)"; Purchasing, vol. 129, No. 1; p. 179; Jul. 13, 2000.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.

Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
"Hudson's Bay Company Realizes Fast ROI with the Oracle E-Business Suite"; PR Newswire; New York; Jan. 15, 2002; p. 1.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,772; Dec. 9, 2009; 14 pages.
Office Action issued in U.S. Appl. No. 11/322,772; Jul. 12, 2010; 18 pages.
Office Action issued in U.S. Appl. No. 11/322,398 on Apr. 2, 2010; 39 pages.

Notice of Allowance issued in U.S. Appl. No. 11/322,398 on Jul. 23, 2010; 38 pages.
Office Action issued in U.S. Appl. No. 11/322,383; Nov. 12, 2009; 29 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,259 on Jul. 6, 2010; 6 pages.
Notice of Allowance issued in U.S. Appl. No. 11/396,288; May 20, 2010; 15 pages.
Office Action issued in U.S. Appl. No. 11/396,288; Aug. 19, 2009; 20 pages.
Office Action issued in U.S. Appl. No. 11/396,258; Nov. 25, 2009; 9 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Notice of Allowance issued in U.S. Appl. No. 11/396,258 on Jul. 28, 2010; 9 pages.
Office Action issued in U.S. Appl. No. 11/396,236 on Mar. 31, 2010; 20 pages.
Office Action issued in U.S. Appl. No. 11/323,039; Sep. 4, 2009; 36 pages.
Office Action issued in U.S. Appl. No. 11/323,039; Apr. 14, 2010; 15 pages.
Office Action issued in U.S. Appl. No. 11/322,851; Sep. 2, 2009; 32 pages.
Office Action issued in U.S. Appl. No. 11/322,851; May 12, 2010; 15 pages.
Office Action issued in U.S. Appl. No. 11/322,845; Jul. 15, 2010; 16 pages.
Office Action issued in U.S. Appl. No. 11/323,040; Jul. 24, 2009; 35 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Office Action issued in U.S. Appl. No. 11/397,026; Jul. 21, 2009; 28 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Office Action issued in U.S. Appl. No. 11/322,482; Jan. 7, 2010; 19 pages.
Notice of Allowance issued in U.S. Appl. No. 11/322,482; Jul. 13, 2010; 5 pages.
Office Action issued in U.S. Appl. No. 11/323,590; Jul. 10, 2009; 32 pages.
Office Action issued in U.S. Appl. No. 11/323,590; Dec. 30, 2009; 31 pages.
Office Action issued in U.S. Appl. No. 11/323,590; Jun. 21, 2010; 25 pages.
Office Action issued in U.S. Appl. No. 11/322,816; Jul. 23, 2009; 41 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Jun. 25, 2009; 9 pages.
Office Action issued in U.S. Appl. No. 12/333,085; Mar. 23, 2010; 5 pages.
Bin et al.; "Component Model Optimization for Distributed Real-Time Embedded Software"; IEEE International Conference on Systems, Man and Cybernetics; Oct. 13, 2004; 6 pages.
Cascallar, Eduardo et al.; "Assessment in the Evaluation of Self-Regulation as a Process"; Educational Psychology Review; vol. 18, No. 3; Sep. 2006; pp. 297-306.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cool, David W.; "Activity Fund Accounting"; School Business Affairs; vol. 49, No. 6; Jun. 1983; pp. 50-52.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Finin et al.; "KQML as an Agent Communication Language"; retrieved on Jul. 26, 2011; pp. 456-463. <http://portal.acm.org/citation.cfm?id=191322>.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=repl<ype=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
SAP AG; "SAP NetWeaver Visual Composer: User Guide (SAP NetWeaver Visual Composer release 6.0)"; Document version 1.1; pp. 1-208.
SAP AG; "Powered by SAP NetWeaver Partner Program—Frequently Asked Questions"; May 2005; 10 pages, [online] http://www.lionbridge.com/NR/rdonlyres/4940BE1F/DA46/412E/AB16/F049BD865CA1/0/PBMW FAQ_50070686_en.pdf.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,236 on Oct. 28, 2010; 19 pages.
Notice of Allowance issued in U.S. Appl. No. 12/233,554 on Sep. 17, 2010; 10 pages.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.

Office Action issued in U.S. Appl. No. 11/322,973 on Dec. 7, 2010; 13 pages.
Office Action issued in U.S. Appl. No. 11/322,973 on May 27, 2011; 15 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Office Action issued in U.S. Appl. No. 11/404,147 on Aug. 4, 2011; 26 pages.
Office Action issued in U.S. Appl. No. 12/332,965 on Oct. 11, 2011; 6 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 11/967,483 on Aug. 20, 2010; 10 pages.
Office Action issued in U.S. Appl. No. 11/967,483 on Mar. 4, 2011; 6 pages.
Office Action issued in U.S. Appl. No. 12/327,232 on May 26, 2011; 20 pages.
Office Action issued in U.S. Appl. No. 12/327,590 on Jun. 23, 2011; 16 pages.
Notice of Allowance issued in U.S. Appl. No. 12/333,085; Sep. 13, 2010; 8 pages.
Office Action issued in U.S. Appl. No. 12/233,087 on Aug. 18, 2011; 42 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 11/322,382 on Sep. 20, 2010; 6 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Office Action issued in U.S. Appl. No. 11/322,383 on May 12, 2010; 23 pages.
Office Action issued in U.S. Appl. No. 11/322,383 on Nov. 12, 2009; 23 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,259 on Aug. 5, 2011; 7 pages.
Office Action issued in U.S. Appl. No. 11/396,288 on Oct. 17, 2011; 38 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Notice of Allowance issued in U.S. Appl. No. 11/968,054 on Aug. 2, 2011; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,458 on Oct. 12, 2011; 19 pages.
Office Action issued in U.S. Appl. No. 12/233,557 on Sep. 16, 2010; 16 pages.
Office Action issued in U.S. Appl. No. 11/967,489 on Sep. 28, 2011; 7 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 o n Apr. 15, 2011; 12 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Anonymous; "Mastering Management"; Motor Age, vol. 25, No. 10; Oct. 2006; pp. 1-3.

Gerin et al.; "Flexible and Executable Hardware/Software Interface Modeling for Multiprocessor SOC Design Using SystemC"; IEEE; 2007; pp. 390-395.

Hahn; "A Domain Specific Modeling Language for Multi-Agent Systems"; ACM AAMAS; 2008; pp. 233-240.

Hu; "A Co-Design Modeling Approach for Computer Network Systems"; IEEE; 2007; pp. 685-693.

"IDe Partners with Journyx to Offer Customers Best-in-Class Time Management Solution"; PR Newswire; Mar. 8, 2005; Business Dateline.

Kremic, Tibor; "Outsourcing Decision Support: A Survey of Benefits, Risks, and Decision Factor"; Supply Chain Management; V. 11; 2006; pp. 467-482.

Meseroll, Robert; "Data Mining Navy Flight"; IEEE Autotestcom 2007; Sep. 2007; pp. 476- 481.

Sarjoughian et al.; "CoSMOs: A Visual Environment for Component Based Modeling, Experimental Design and Simulation"; ACM; 2009; pp. 1-9.

Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.

"Trakware Systems Inc. Expands Management Team: Leading To-Order Software Provider Adds Experienced Global VP Sales and Marketing to its World-Class Team"; Canada NewsWire; Apr. 9, 2008.

Trappey, Amy; "Design and Analysis of a Rule Based Knowledge"; International Journal of Manufacturing Tech; Dec. 2007; 35,3-4:385-93.

Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.

Notice of Allowance issued in U.S. Appl. No. 12/233,550 on Jan. 9, 2012; 11 pages.

Office Action issued in U.S. Appl. No. 12/333,146 on Feb. 2, 2012; 21 pages.

Notice of Allowance issued in U.S. Appl. No. 11/396,327 on Sep. 28, 2011; 31 pages.

Office Action issued in U.S. Appl. No. 12/233,479 on Oct. 27, 2011; 24 pages.

Notice of Allowance in U.S. Appl. No. 12/233,462 on Dec. 12, 2011; 6 pages.

Notice of Allowance in U.S. Appl. No. 12/233,462 on Apr. 5, 2012; 7 pages.

Office Action issued in U.S. Appl. No. 12/233,289 on Oct. 27, 2011; 15 pages.

Notice of Allowance issued in U.S. Appl. No. 12/233,289 on Feb. 15, 2012; 11 pages.

Notice of Allowance issued in U.S. Appl. No. 12/233,457 on Nov. 3, 2011; 12 pages.

Notice of Allowance issued in U.S. Appl. No. 12/327,232 on Nov. 2, 2011; 16 pages.

Notice of Allowance issued in U.S. Appl. No. 12/327,590 on Dec. 28, 2011; 10 pages.

Office Action issued in U.S. Appl. No. 12/327,701 on Nov. 8, 2011; 20 pages.

Notice of Allowance issued in U.S. Appl. No. 12/327,701 on Apr. 6, 2012; 9 pages.

Notice of Allowance issued in U.S. Appl. No. 12/233,087 on Mar. 30, 2012; 30 pages.

Notice of Allowance issued in U.S. Appl. No. 12/233,534 won Dec. 28, 2011; 7 pages.

Notice of Allowanced issued in U.S. Appl. No. 11/322,398 on Oct. 18, 2011; 7 pages.

Examiner's Answer to Appeal Brief issued in U.S. Appl. No. 11/396,236 on Nov. 10, 2011; 19 pages.

Notice of Allowance issued in U.S. Appl. No. 11/396,259 on Mar. 15, 2012; 7 pages.

Notice of Allowance issued in U.S. Appl. No. 11/396,250 on Dec. 7, 2011; 6 pages.

Notice of Allowance issued in U.S. Appl. No. 11/396,258 on Feb. 3, 2012; 12 pages.

Office Action issued in U.S. Appl. No. 11/396,252 on Nov. 10, 2011; 18 pages.

Notice of Allowance issued in U.S. Appl. No. 11/322,851 on Mar. 1, 2012; 9 pages.

Notice of Allowance issued in U.S. Appl. No. 11/322,845; Nov. 13, 2011; 9 pages.

Notice of Allowance issued in U.S. Appl. No. 11/397,026 on Nov. 4, 2011; 8 pages.

Notice of Allowance issued in U.S. Appl. No. 11/397,026 on Feb. 23, 2012; 8 pages.

Notice of Allowance issued in U.S. Appl. No. 12/233,520 on Nov. 10, 2011; 22 pages.

Office Action issued in U.S. Appl. No. 11/967,489 on Feb. 6, 2012; 9 pages.

Notice of Allowance issued in U.S. Appl. No. 11/967,393 on Nov. 9, 2011; 9 pages..

Office Action issued in U.S. Appl. No. 12/327,737 on Mar. 26, 2012; 14 pages.

Notice of Allowance issued in U.S. Appl. No. 12/233,075 on Mar. 22, 2012; 25 pages.

* cited by examiner

ARCHITECTURAL DESIGN FOR PRODUCT CATALOG MANAGEMENT APPLICATION SOFTWARE

BACKGROUND

The subject matter of this patent application relates to computer software architecture, and more particularly to the architecture of application software for product catalog management.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application.

The invention can be implemented as methods, systems, and apparatus, including computer program products, for implementing a software architecture design for a software application implementing catalog management useful to create or update published catalogs based on product master data changes or external supplier catalogs. The application is structured as multiple process components interacting with each other through service interfaces, and multiple service interface operations, each being implemented for a respective process component. The process components include a Purchasing Contract Processing process component that handles agreements between a purchaser and a supplier; a Product Catalogue Authoring process component that creates and edits product catalogs by collecting product information from relevant sources, controls the quality of the product catalogs' contents, and controls when and to what extent Product Catalogues can be published; and a Product Catalogue Publishing process component that makes published product catalogs available to a large number of users electronically for use in other business processes.

The invention can further be implemented as methods, systems, and apparatus, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
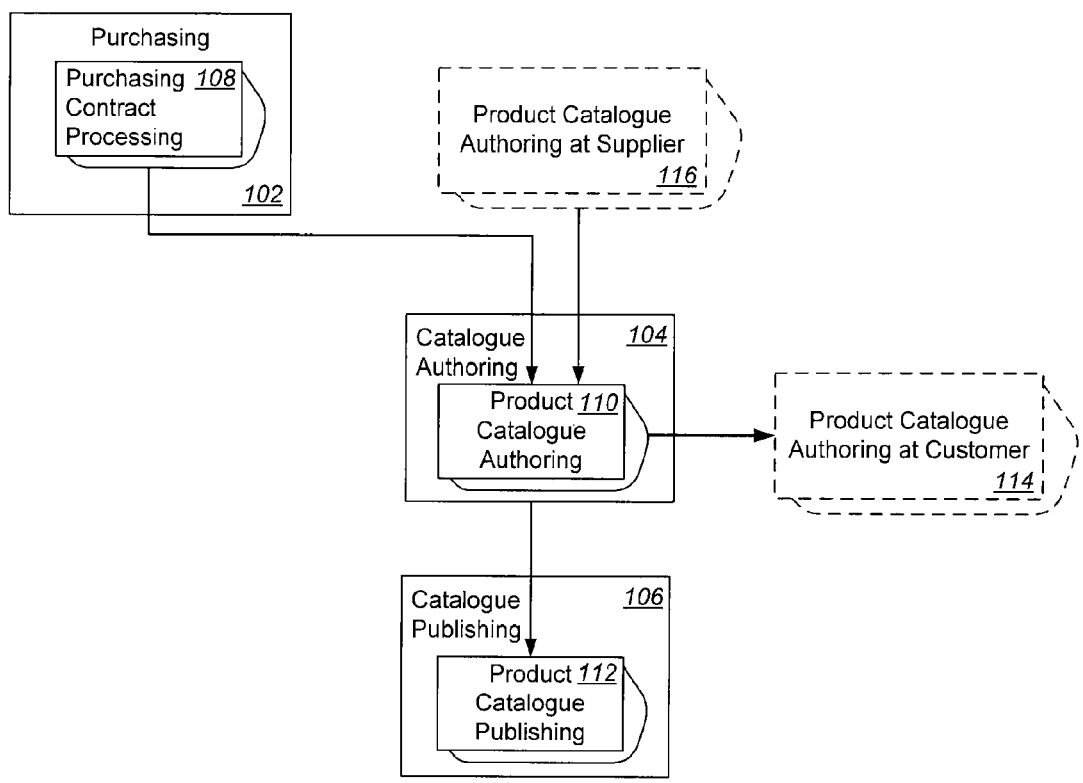
FIG. 1 is a block diagram of a software architectural design for a product catalog management software application.

FIG. 1 shows the software architectural design for a product catalog management software application. The product catalog management application is software that implements an end-to-end process used to create or update a published catalog based on product master data changes or external supplier catalogs.

The product catalog management design includes three deployment units: a Purchasing deployment unit 102, a Catalogue Authoring deployment unit 104, and a Catalogue Publishing deployment unit 106.

The Purchasing deployment unit 102 contains a Purchasing Contract Processing process component 108 that records all relevant business transactions. The Purchasing Contract Processing process component 108 is used to handle agreements between a purchaser and a supplier that covers the supply of goods or the performance of services at agreed conditions.

The Catalogue Authoring deployment unit 104 contains a Product Catalogue Authoring process component 110. The Product Catalogue Authoring process component 110 is used to: create and edit product catalogs by collecting product information from the relevant sources; control the quality of the product catalogs' contents; and control when and to what extent Product Catalogues can be published for use in other business processes.

The Catalogue Publishing deployment unit 106 contains a Product Catalogue Publishing process component 112. The Product Catalogue Publishing process component 112 is used to make published product catalogs available to a large number of users in an electronic manner, as a means to interactively search for and select products for use in other business processes. Published product catalogs are product catalogs that have been released for use in business processes.

A number of external process components, described below, will be used to describe the architectural design. These include a Product Catalogue Authoring at Customer process component 114 and a Product Catalogue Authoring at Supplier process component 116. The Product Catalogue Authoring at Customer process component 114 receives updates from the Product Catalogue Authoring process component 110 and the Product Catalogue Authoring at Supplier 116 process component 116 provides updates to the Product Catalogue Authoring process component 110.

Figure 2:
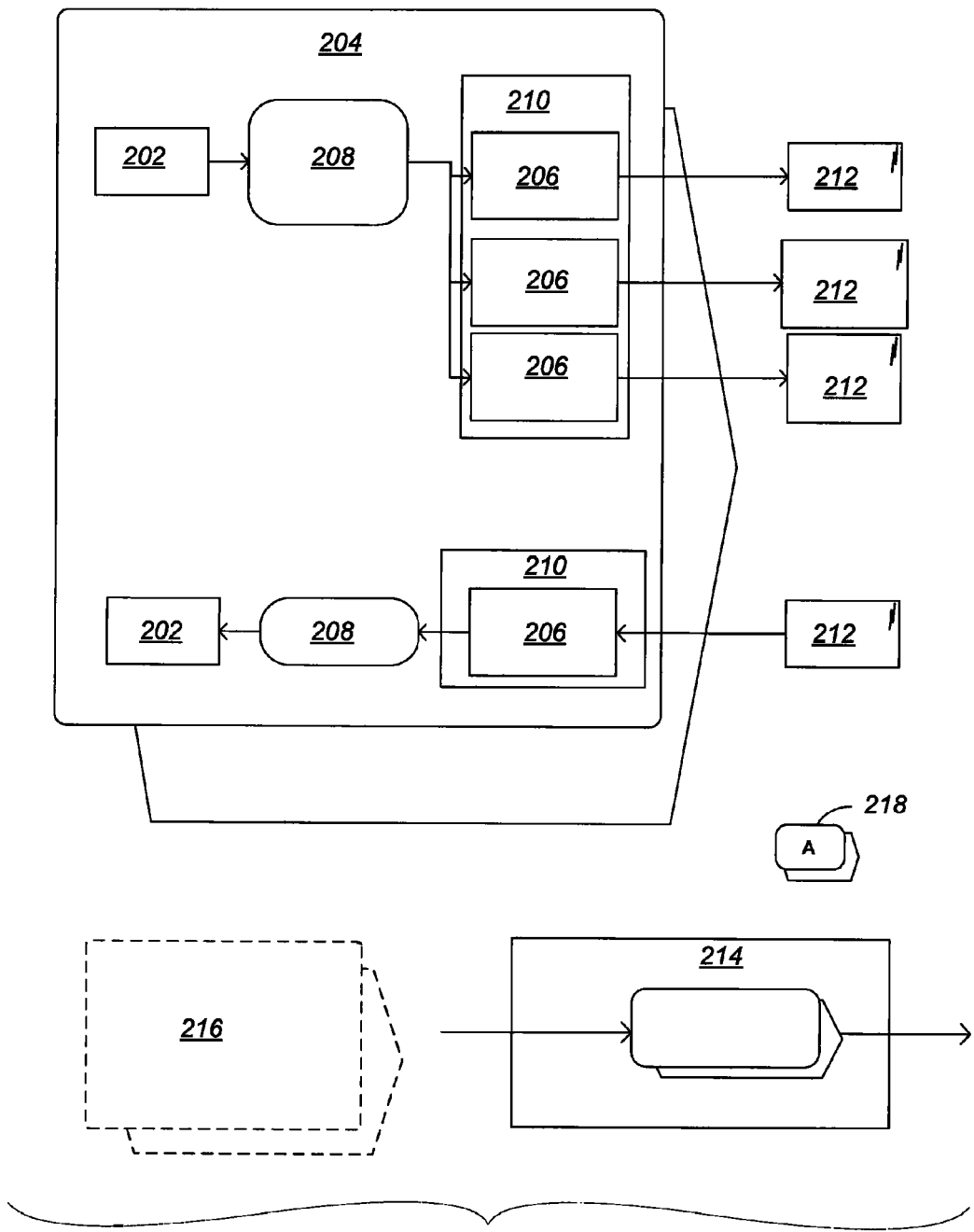
FIG. 2 illustrates the elements of the architecture as they are drawn in the figures of this patent application.

FIG. 2 illustrates the elements of the architecture as they are drawn in the figures of this patent application. The elements of the architecture include the business object (drawn as icon 202), the process component (drawn as icon 204), the operation (drawn as icon 206), the process agent (drawn as icon 208), the service interface or interface (drawn as icon 210), the message (drawn as icon 212), and the deployment unit (drawn as icon 214).

Not explicitly represented in the figures is a foundation layer that contains all fundamental entities that are used in multiple deployment units. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that are specific to a deployment unit should be assigned to their respective deployment unit.

A process component of an external system is drawn as a dashed-line process component (drawn as icon 216). Such a process component may be referred to as an external process component, and it is used to represent the external system in describing interactions with the external system; however, this should be understood to require no more of the external system that it be able to produce and receive messages as required by the process component that interacts with the external system.

The connector icon 218 is used to simplify the drawing of interactions between process components.

The connector icon 218 is used to simplify the drawing of interactions between process components.

Interactions between process component pairs involving their respective business objects, process agents, operations, interfaces, and messages are described as process component interactions, which determine the interactions of a pair of process components across a deployment unit boundary, i.e., from one deployment unit to another deployment unit. Interactions between process components are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components, but interfaces, process agents, and business objects that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. A process component is a software package that realizes a business process and generally exposes its functionality as services. The functionality contains business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters serving as a signature.

The architectural elements also include the service interface, referred to simply as the interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement supports the operations of the original.

Interactions between Process Components "Product Catalogue Authoring" and "Product Catalogue Authoring at Customer"

Figure 3:
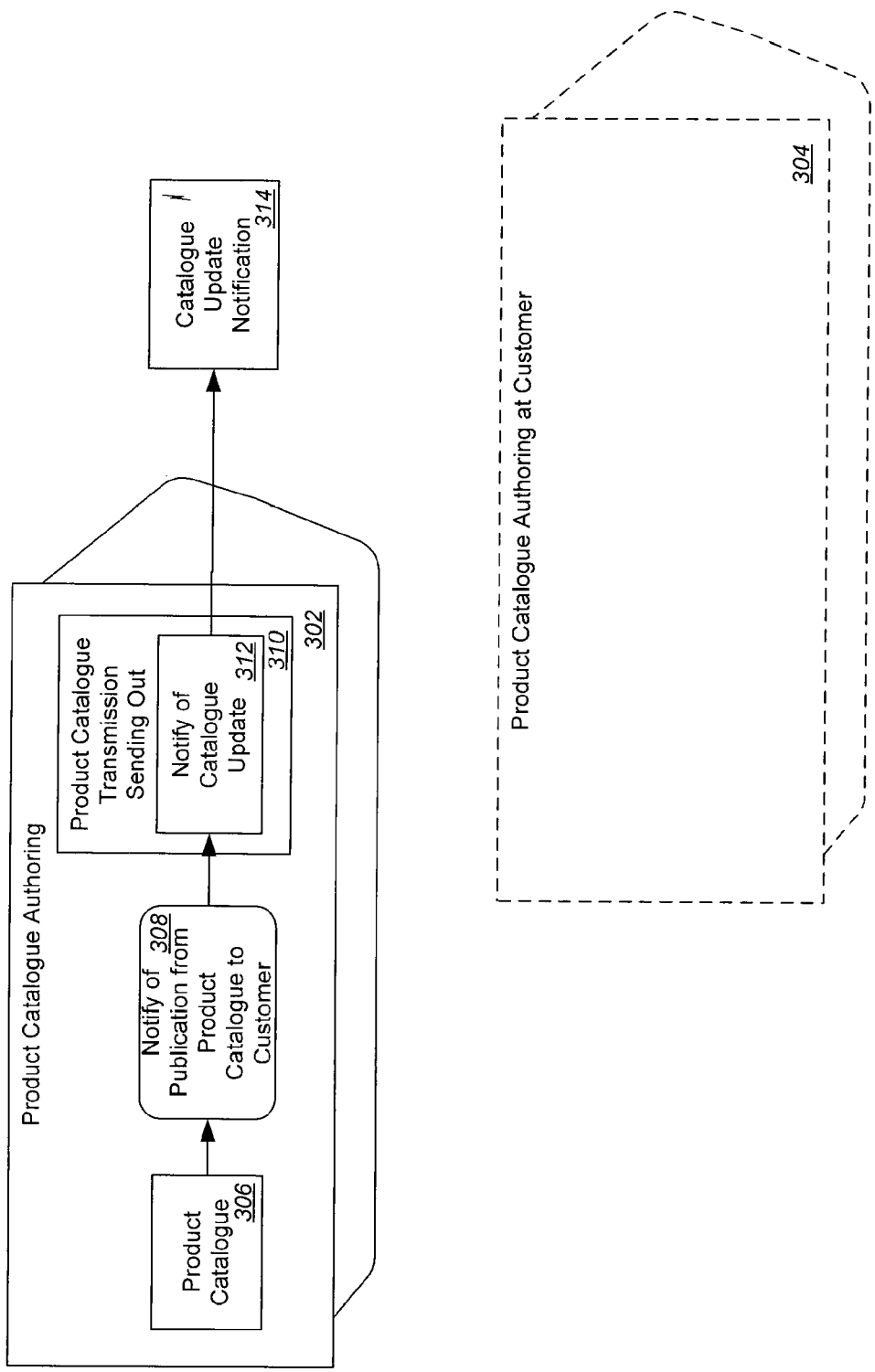
FIG. 3 is a block diagram showing interactions between a Product Catalogue Authoring process component and a Product Catalogue Authoring at Customer process component.

FIG. 3 is a block diagram showing interactions between a Product Catalogue Authoring process component 302 and a Product Catalogue Authoring at Customer process component 304 in the architectural design of FIG. 1.

The Product Catalogue Authoring process component 302 contains a Product Catalogue business object 306, a Notify of Publication from Product Catalogue to Customer outbound process agent 308, and a Product Catalogue Transmission Sending Out interface 310.

The Product Catalogue business object 306 represents a structured directory of catalog items, where each catalog item represents a product and provides information about it. A product catalog serves to provide or exchange information about a subset of a company's products. The information is tailored to a specific target group of people, to provide exactly the information the group of people needs or to advertise the products to the group.

The Product Catalogue business object 306 initiates publication notifications within the Product Catalogue Authoring process component 302. The Product Catalogue business object 306 first sends a request to the Notify of Publication from Product Catalogue to Customer outbound process agent 308. For example, the request may notify the customer of catalog publication. Here, the outbound process agent 308 invokes a Notify of Catalogue Update operation 312 provided by the Product Catalogue Transmission Sending Out interface 310. Next, the Notify of Catalogue Update operation 312 transmits a Catalogue Update Notification message 314 to another process component, such as the Product Catalogue Authoring at Customer process component 304, notifying another party about a catalog publication. This can be a new catalog or an update to a previously published catalog.

Interactions between Process Components "Purchasing Contract Processing" and "Product Catalogue Authoring"

Figure 4:
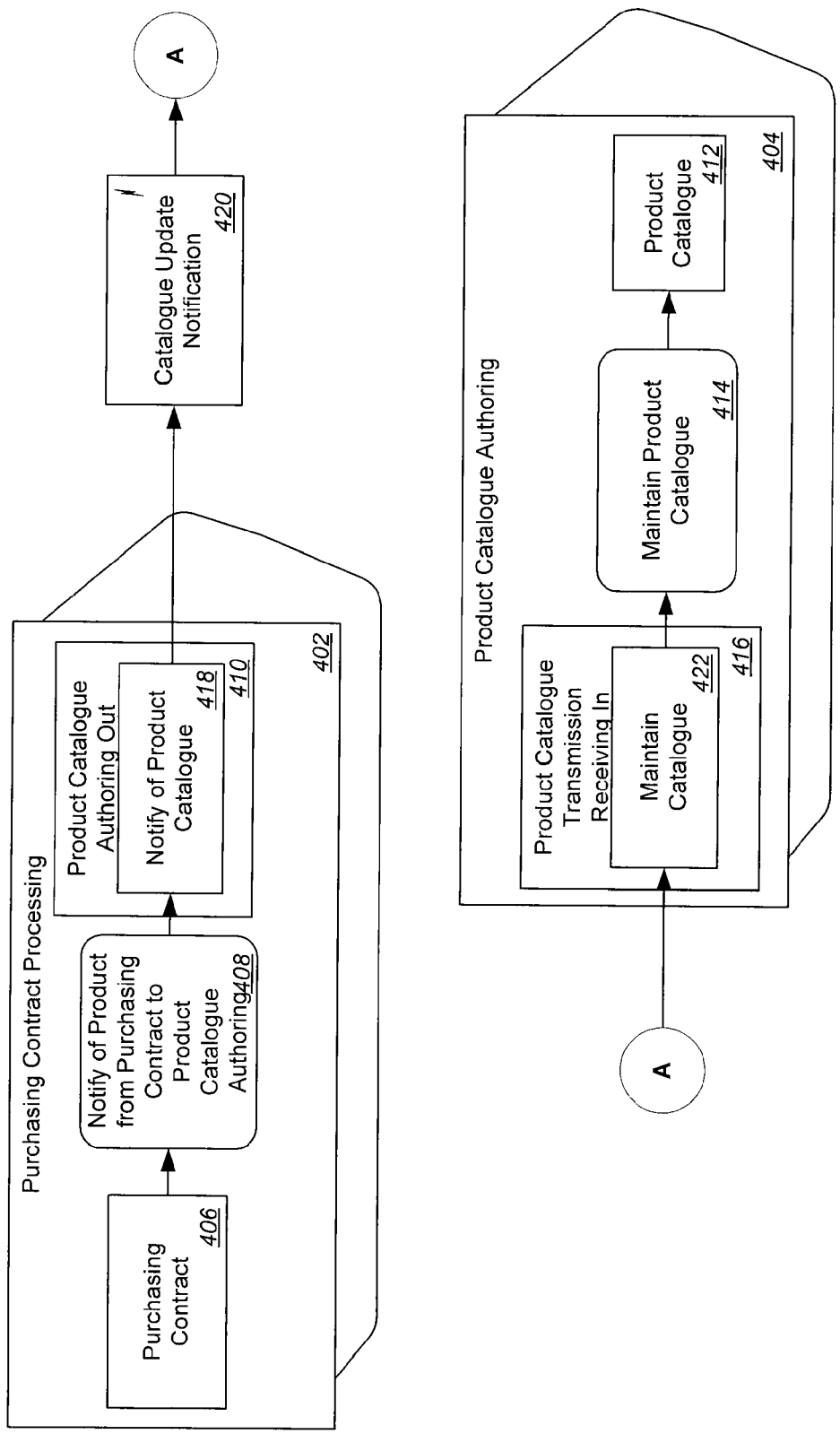
FIG. 4 is a block diagram showing interactions between a Purchasing Contract Processing process component and a Product Catalogue Authoring process component.

FIG. 4 is a block diagram showing interactions between a Purchasing Contract Processing process component 402 and a Product Catalogue Authoring process component 404 in the architectural design of FIG. 1.

The Purchasing Contract Processing process component 402 contains a Purchasing Contract business object 406, a Notify of Product from Purchasing Contract to Product Catalogue Authoring outbound process agent 408, and a Product Catalogue Authoring Out interface 410. The Purchasing Contract business object 406 represents an agreement between a purchaser and a supplier that covers the supply of goods or the performance of services at agreed conditions.

The Product Catalogue Authoring process component 404 contains a Product Catalogue business object 412, a Maintain Product Catalogue inbound process agent 414, and a Product Catalogue Transmission Receiving In interface 404. The Product Catalogue business object 412 represents a structured directory of catalog items, where each catalog item represents a product and provides information about it.

In the Purchasing Contract Processing process component 402, the Purchasing Contract business object 406 first sends a request to the Notify of Product from Purchasing Contract to Product Catalogue Authoring outbound process agent 408. For example, the request may inform product catalog authoring that a new product is available. Here, the outbound process agent 408 invokes a Notify of Product Catalog operation 418 provided by the Product Catalogue Authoring Out interface 410. Next, the Notify of Product Catalog operation 418 transmits a Catalogue Update Notification message 420 to request that the catalog be updated.

In the Product Catalogue Authoring process component 404, interactions involving catalog updates originate from the Catalogue Update Notification message 420. The Catalogue Update Notification message 420 is received by a Maintain Catalogue operation 422 provided by the Product Catalogue Transmission Receiving In interface 416. Here, the operation 422 sends a request to the Maintain Product Catalogue inbound process agent 414, which updates the Product Catalogue business object.

Interactions between Process Components "Product Catalogue Authoring at Supplier" and "Product Catalogue Authoring"

Figure 5:
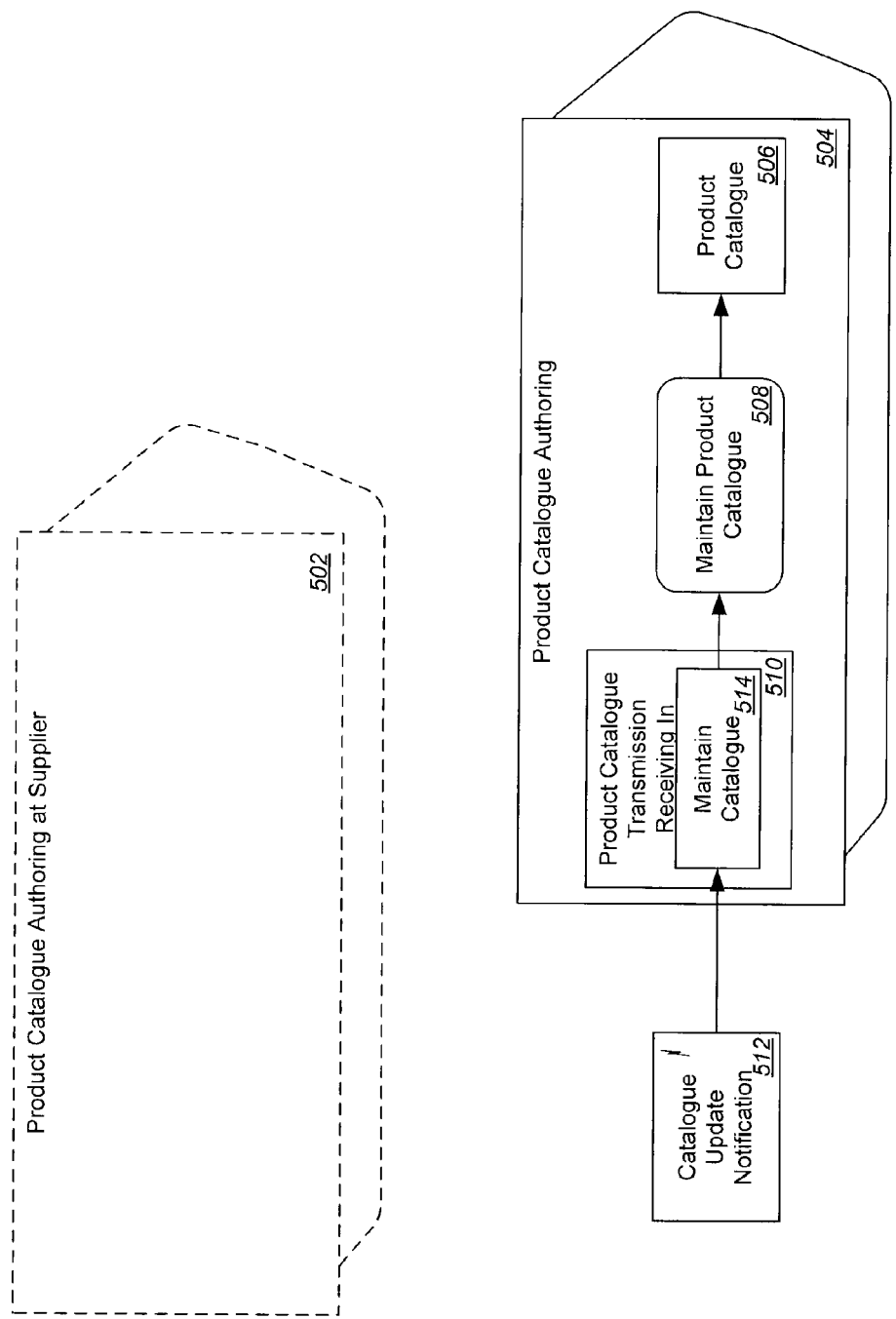
FIG. 5 is a block diagram showing interactions between a Product Catalogue Authoring at Supplier process component and a Product Catalogue Authoring process component.

FIG. 5 is a block diagram showing interactions between a Product Catalogue Authoring at Supplier process component 502 and a Product Catalogue Authoring process component 504 in the architectural design of FIG. 1.

The Product Catalogue Authoring process component 504 contains a Product Catalogue business object 506, a Maintain Product Catalogue inbound process agent 508, and a Product Catalogue Transmission Receiving In interface 510. The Product Catalogue business object 506 represents a structured directory of catalog items, where each catalog item represents a product and provides information about it.

Catalogue interactions within the Product Catalogue Authoring process component 504 are initiated upon receipt of a Catalogue Update Notification message 512. The Catalogue Update Notification message 512 is received by a Maintain Catalogue operation 514 provided by the Product Catalogue Transmission Receiving In. Here, the operation 514 sends a request to the Maintain Product Catalogue inbound process agent 508, which updates the Product Catalogue business object 506. For example, the product catalog is updated to show the changes received.

Interactions between Process Components "Product Catalogue Authoring" and "Product Catalogue Publishing"

Figure 6:
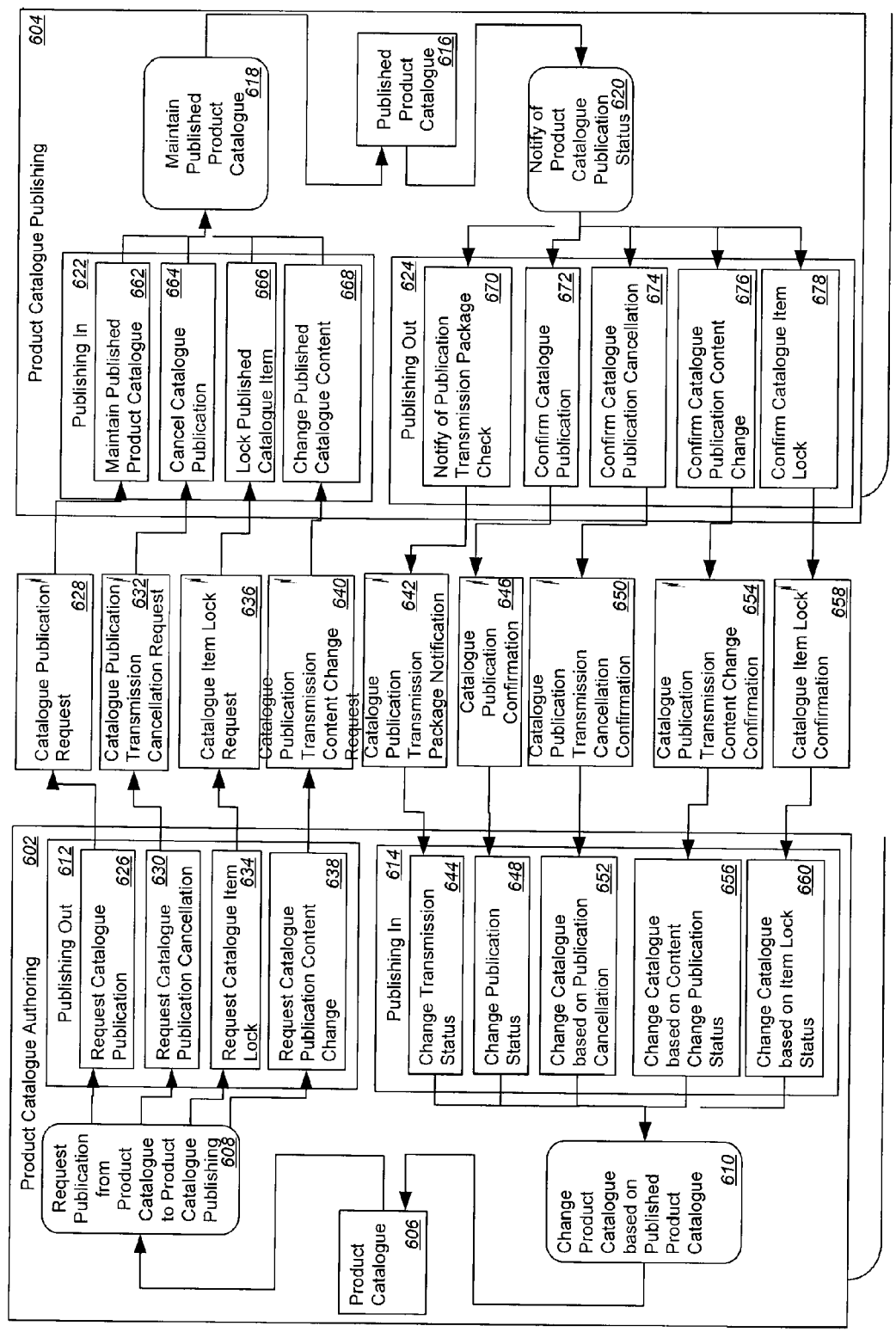
FIG. 6 is a block diagram showing interactions between a Product Catalogue Authoring process component and a Product Catalogue Publishing component.

FIG. 6 is a block diagram showing interactions between a Product Catalogue Authoring process component 602 and a Product Catalogue Publishing process component 604 in the architectural design of FIG. 1.

The Product Catalogue Authoring process component 602 contains a Product Catalogue business object 606, a Request Publication from Product Catalogue to Product Catalogue Publishing outbound process agent 608, a Change Product Catalogue based on Published Product Catalogue inbound process agent 610, a Publishing Out interface 612, and a Publishing In interface 614. The Product Catalogue business object 606 represents a structured directory of catalog items, where each catalog item represents a product and provides information about it.

The Product Catalogue Publishing process component 604 contains a Published Product Catalogue business object 616, a Maintain Published Product Catalogue inbound process agent 618, a Notify of Product Catalogue Publication Status outbound process agent 620, a Publishing In interface 622, and a Publishing Out interface 624. The Published Product Catalogue business object 616 represents a version of a product catalog that has been released for access by, or exchange with, the target group of people for which the product catalog's content has been tailored. Access by the target group may be by software, typically via a network, that essentially provides read-only access to the information in the catalog. Exchange may occur as an electronic document via a data carrier (email or CDs, for example), as printed copies, or any some other media for information exchange.

Updates of the Product Catalogue business object 606 may trigger interactions in the Product Catalogue Authoring process component 602. In one type of interaction, a request for catalog publication may be made. The Product Catalogue business object 606 first sends a request to the Request Publication from Product Catalogue to Product Catalogue Publishing outbound process agent 608. For example, the Product Catalogue business object 606 may request the catalog publication system to publish a new catalog, or update or delete an already published catalog. The request may be transmitted in several packages. Here, the outbound process agent 608 invokes a Request Catalogue Publication operation 626 provided by the Publishing Out interface 612. Next, the Request Catalogue Publication operation 626 transmits a Catalogue Publication Request message 628 requesting to publish a new or changed catalog or to delete an already published catalog.

In another type of interaction, a request for cancelling published catalogs may be made. The Product Catalogue business object 606 first sends a request to the Request Publication from Product Catalogue to Product Catalogue Publishing outbound process agent 608. For example, the request may cancel processing of a catalog. Here, the outbound process agent 608 invokes a Request Catalogue Publication Cancellation operation 630 provided by the Publishing Out interface 612. Next, the Request Catalogue Publication Cancellation operation 630 transmits a Catalogue Publication Transmission Cancellation Request message 632 requesting cancellation of the transmission of a catalog and to restore an earlier published state (if such exists) of the catalog.

In yet another type of interaction, a request for a catalog item lock may be made. The Product Catalogue business object 606 first sends a request to the Request Publication from Product Catalogue to Product Catalogue Publishing outbound process agent 608. For example, the request may lock single items of the published catalog, or prevent single items from being included in unpublished catalogs. Here, the outbound process agent 608 invokes a Request Catalogue Item Lock operation 634 provided by the Publishing Out interface 612. Next, the Request Catalogue Item Lock operation 634 transmits a Catalogue Item Lock Request message 636 requesting to lock single items of the catalog contained in the catalog publication transmission.

In yet another type of interaction, a request for catalog content change may be made. The Product Catalogue business object 606 first sends a request to the Request Publication from Product Catalogue to Product Catalogue Publishing outbound process agent 608. For example, the request may change, add or delete a limited number of catalog items contained in the published catalog. Here, the outbound process agent 608 invokes a Request Catalogue Publication Content Change operation 638 provided by the Publishing Out interface 612. Next, the Request Catalogue Publication Content Change operation 638 transmits a Catalogue Publication Transmission Content Change Request message 640 requesting to change, create or to delete a limited number of catalog items contained in the catalog publication transmission.

The Product Catalogue Authoring process component 602 may also receive messages from other process components, such as the Product Catalogue Publishing process component 604. In one type of interaction, the Catalogue Publication Transmission Package Notification message 642 is received by a Change Transmission Status operation 644 provided by the Publishing In interface 614. The message 642 may be a notification from catalog publishing to catalog authoring about the reception of a package of a catalog publication transmission and information about the validity of the package's content. Here, the operation 644 sends a request to the Change Product Catalogue based on Published Product Catalogue inbound process agent 610, which updates the Product Catalogue business object 606. For example, the product catalog is updated with the status of an ongoing catalog publication transmission package.

In another type of interaction, the Catalogue Publication Confirmation message 646 is received by a Change Publication Status operation 648 provided by the Publishing In interface 614. The message 646 may be the confirmation from catalog publishing to catalog authoring whether the publication or deletion of a catalog requested by a catalog publication was successful or not. Here, the operation 648 sends a request to the Change Product Catalogue based on Published Product Catalogue inbound process agent 610, which updates the Product Catalogue business object 606. For example, the product catalog is updated with the status of an ongoing catalog publication.

In yet another type of interaction, the Catalogue Publication Transmission Cancellation Confirmation message 650 is received by a Change Catalogue based on Publication Cancellation operation 652 provided by the Publishing In interface 614. The message 650 may be the confirmation from catalog publishing whether the transmission of a catalog has been cancelled successfully and an earlier published state of this catalog (if such exists) has been restored or not. Here, the operation 652 sends a request to the Change Product Catalogue based on Published Product Catalogue inbound process agent 610, which updates the Product Catalogue business object 606. For example, the product catalog is updated with the result status of a request to cancel an ongoing catalog publication transmission.

In yet another type of interaction, the Catalogue Publication Transmission Content Change Confirmation message 654 is received by a Change Catalogue based on Content Change Publication Status operation 656 provided by the Publishing In interface 614. The message 654 may be the confirmation from catalog publishing to catalog authoring whether a limited number of catalog items contained in the catalog publication transmission could be changed, created or deleted. Here, the operation 656 sends a request to the Change Product Catalogue based on Published Product Catalogue inbound process agent 610, which updates the Product Catalogue business object 606. For example, the product catalog is updated with the content change confirmation.

In yet another type of interaction, the Catalogue Item Lock Confirmation message 658 is received by a Change Catalogue based on Item Lock Status operation 660 provided by the Publishing In interface 614. The message 658 may be the confirmation from catalog publishing to the catalog authoring whether single items of the catalog contained in the catalog publication transmission could be locked or not. Here, the operation 660 sends a request to the Change Product Catalogue based on Published Product Catalogue inbound process agent 610, which updates the Product Catalogue business object 606. For example, the product catalog is updated with the item lock status.

The Product Catalogue Publishing process component 604 may receive messages from other process components, such as the Product Catalogue Authoring process component 602, and update the Published Product Catalogue business object 616. In one type of interaction, the Catalogue Publication Request message 628 is received by a Maintain Published Product Catalogue operation 662 provided by the Publishing In interface 622. The message 628 may be a request to publish a new or changed catalog or to delete an already published catalog. Here, the operation 662 sends a request to the Maintain Published Product Catalogue inbound process agent 618, which updates the Published Product Catalogue business object 616.

In another type of interaction, the Catalogue Publication Transmission Cancellation Request message 632 is received by a Cancel Catalogue Publication operation 664 provided by the Publishing In interface 622. The message 632 may request cancellation of the transmission of a catalog and to restore an earlier published state (if such exists) of the catalog. Here, the operation 664 sends a request to the Maintain Published Product Catalogue inbound process agent 618, which updates the Published Product Catalogue business object 616.

In yet another type of interaction, the Catalogue Item Lock Request message 636 is received by a Lock Published Catalogue Items operation 666 provided by the Publishing In interface 622. The message 636 may be a request to lock single items of the catalog contained in the catalog publication transmission. Here, the operation 666 sends a request to the Maintain Published Product Catalogue inbound process agent 618, which updates the Published Product Catalogue business object 616. For example, the published product catalog is updated with the locked items.

In yet another type of interaction, the Catalogue Publication Transmission Content Change Request message 640 is received by a Change Published Catalogue Content operation 668 provided by the Publishing In interface 622. The message 640 may be a request to change, create or to delete a limited number of catalog items contained in the catalog publication transmission. Here, the operation 668 sends a request to the Maintain Published Product Catalogue inbound process agent 618, which updates the Published Product Catalogue business object 616. For example, the published product catalog is updated with the changed contents.

Within the Product Catalogue Publishing process component 604, interactions involving product catalog publishing also may originate in the Published Product Catalogue business object 616. In one type of interaction, a request for notification of a publication package may be made. The Published Product Catalogue business object 616 first sends a request to the Notify of Product Catalogue Publication Status outbound process agent 620. For example, the request may to notify product Catalogue Authoring of a publication transmission package check. Here, the outbound process agent 620 invokes a Notify of Publication Transmission Package Check operation 670 provided by the Publishing Out interface 624. Next, the Notify of Publication Transmission Package Check operation 670 transmits a Catalogue Publication Transmission Package Notification message 642 with notification of the transmission.

In another type of interaction, a request for publication notification may be made. The Published Product Catalogue business object 616 first sends a request to the Notify of Product Catalogue Publication Status outbound process agent 620. For example, the request may confirm to the sender of a catalog publication transmission that the publication or deletion of the catalog as requested was successful. Here, the outbound process agent 620 invokes a Confirm Catalogue Publication operation 672 provided by the Publishing Out interface 624. Next, the Confirm Catalogue Publication operation 672 transmits a Catalogue Publication Confirmation message 646 to send the confirmation.

In yet another type of interaction, a request for a publication cancellation notification may be made. The Published Product Catalogue business object 616 first sends a request to the Notify of Product Catalogue Publication Status outbound process agent 620. For example, the request may confirm that a cancellation request from product catalog authoring was received successfully. Here, the outbound process agent 620 invokes a Confirm Catalogue Publication Cancellation operation 674 provided by the Publishing Out interface 624. Next, the Confirm Catalogue Publication Cancellation operation 674 transmits a Catalogue Publication Transmission Cancellation Confirmation message 650 confirming the publication cancellation.

In yet another type of interaction, a request for content change confirmation may be made. The Published Product Catalogue business object 616 first sends a request to the Notify of Product Catalogue Publication Status outbound process agent 620. For example, the request may confirm to the requester that the requested catalog content change was completed. Here, the outbound process agent 620 invokes a Confirm Catalogue Publication Content Change operation 676 provided by the Publishing Out interface 624. Next, the Confirm Catalogue Publication Content Change operation 676 transmits a Catalogue Publication Transmission Content Change Confirmation message 654 to confirm the change.

In yet another type of interaction, a request for a catalog item lock confirmation may be made. The Published Product Catalogue business object 616 first sends a request to the Notify of Product Catalogue Publication Status outbound process agent 620. For example, the request may confirm the receipt of a catalog item lock request received from product catalog authoring. Here, the outbound process agent 620 invokes a Confirm Catalogue Item Lock operation 678 provided by the Publishing Out interface 624. Next, the Confirm Catalogue Item Lock operation 678 transmits a Catalogue Item Lock Confirmation message 658 to confirm the catalog item lock.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising instructions encoded on a non-transitory, computer-readable medium, the instructions being structured as process components interacting with each other through service interfaces, the instructions performing operations when executed by one or more processors to:

define a plurality of process components, each of the process components comprising a modular and application-independent package of reusable granular software implementing a respective and distinct business process, the business process comprising functionality exposed by the process component via a corresponding service interface, the plurality of process components including:

a Purchasing Contract Processing process component that handles agreements between a purchaser and a supplier related to supply of goods or performance of services;

a Product Catalogue Authoring process component that creates and edits product catalogs by collecting product information from relevant sources, controls the quality of the product catalogues' contents, and controls when and to what extent Product Catalogues can be published for use in other business processes; and a Product Catalogue Publishing process component that makes published product catalogues available to a large number of users electronically as a means to interactively search for and select products for use in other business processes;

define a plurality of service interfaces, each service interface associated with exactly one process and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:

the Purchasing Contract Processing process component and the Product Catalogue Authoring process component, where the pair-wise interaction between the Purchasing Contract Processing process component and the Product Catalogue Authoring process component includes transmission of a catalogue update notification message, from the Purchasing Contract Processing process component to the Product Catalogue Authoring process component, requesting that at least one particular catalog be updated based at least in part on identification of at least one item of modified product data; and the Product Catalogue Authoring process component and the Product Catalogue Publishing component, where the pair-wise interaction between the Purchasing Contract Processing process component and the Product Catalogue Authoring process component includes transmission of:

a catalogue publication request message from the Product Catalogue Authoring process component to the Product Catalogue Publishing process component, the catalogue publication request message comprising a request for performance of a publication task on a catalogue, and a catalogue publication transmission package notification message from the Product Catalogue Publishing process component to the Product Catalogue Authoring process component, the catalogue publication transmission package notification message comprising a notification that a catalogue publication request message has been received at the Product Catalogue Authoring process component, the catalogue publication transmission package notification message further providing information about the validity of content included in the received catalogue publication request message;

a catalogue publication confirmation message from the Product Catalogue Publishing process component to the Product Catalogue Authoring process component, the catalogue publication confirmation message comprising confirmation from the Product Catalogue Publishing process component to the Product Catalogue Authoring process component describing whether the publication or deletion of a catalogue requested by a catalogue publication request message was successful;

a catalogue publication transmission cancellation request message from the Product Catalogue Authoring process component to the Product Catalogue Publishing process component, the catalogue publication transmission cancellation request message comprising a request for cancellation of transmission of a catalogue;

a catalogue publication transmission cancellation confirmation message from the Product Catalogue Publishing process component to the Product Catalogue Authoring process component, comprising a confirmation of a received catalog publication transmission cancellation request;

a catalogue item lock request message from the Product Catalogue Authoring process component to the Product Catalogue Publishing process component, the catalogue item lock request message comprising a request to lock items of the catalogue contained in a catalogue publication transmission;

a catalogue item lock confirmation message from the Product Catalogue Publishing process component to the Product Catalogue Authoring process component, the catalogue item lock confirmation message comprising a confirmation of a catalogue item lock;

a catalogue publication transmission content change request message from the Product Catalogue Authoring process component to the Product Catalogue Publishing process component, the catalogue publication transmission content change request message comprising a request to change, create or to delete a limited number of catalog items contained in a catalog publication transmission; and a catalogue publication transmission content change confirmation message from the Product Catalogue Publishing process component to the Product Catalogue Authoring process component, the catalogue publication transmission content change confirmation message comprising a confirmation from Product Catalogue Publishing to Product Catalogue Authoring regarding whether a limited number of catalogue items contained in the catalogue publication transmission could be changed, created or deleted in response to a received catalogue publication transmission content change request message; and store the defined process components and service interface operations in memory.

2. The product of claim 1, wherein:
each of the plurality of process components is assigned to exactly one deployment unit among multiple deployment units, and each deployment unit is deployable on a separate computer hardware platform independent of every other deployment unit; and
all interaction between a process component in one deployment unit and any other process component in any other deployment unit takes place through the respective service interfaces of the two process components.

3. The product of claim 2, wherein the deployment units comprise:
a Purchasing deployment unit that includes the Purchasing Contract Processing process component;
a Catalogue Authoring deployment unit that includes the Product Catalogue Authoring process component; and
a Catalogue Publishing deployment unit that includes the Product Catalogue Publishing process component.

4. The product of claim 1, wherein:
each of the process components includes one or more business objects; and
none of the business objects of any one of the process components interacts directly with any of the business objects included in any of the other process components.

5. The product of claim 4, wherein the business objects comprise a business process object.

6. The product of claim 4, wherein:
none of the business objects included in any one of the process components is included in any of the other process components.

7. The product of claim 1, further comprising:
a plurality of process agents, each process agent being either an inbound process agent or an outbound process agent, each inbound process agent being operable to receive a message from an inbound operation, each outbound process agent being operable to cause an outbound operation to send a message, and each process agent being associated with exactly one process component.

8. The product of claim 7, wherein:
the inbound process agents comprise a first inbound process agent operable to start execution of steps requested in a first inbound message by creating or updating one or more business object instances.

9. The product of claim 7, wherein:
the outbound process agents comprise a first asynchronous outbound process agent that is called after a business object that is associated with the first outbound process agent changes.

10. The product of claim 1, wherein the operations comprise synchronous and asynchronous operations.

11. A system, comprising:
a computer system comprising at least one hardware platform for executing computer instructions, the computer instructions structured as a plurality of process components interacting with each other through service interfaces, each hardware platform including at least one processor for executing the computer instructions;
at least one memory storing a plurality of process components executable by the respective processor of the particular hardware platform, each of the process components comprising a modular and application-independent package of reusable granular software implementing a respective and distinct business process, the business process comprising functionality exposed by the process component via at least one service interface, the plurality of process components including:
a Purchasing Contract Processing process component that handles agreements between a purchaser and a supplier related to supply of goods or performance of services;
a Product Catalogue Authoring process component that creates and edits product catalogues by collecting product information from relevant sources, controls the quality of the product catalogues' contents, and controls when and to what extent product catalogues can be published for use in other business processes; and
a Product Catalogue Publishing process component that makes published product catalogues available to a large number of users electronically as a means to interactively search for and select products for use in other business processes; and
the at least one memory further storing a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message based pair wise interaction between the respective process components of the respective operations, the pair-wise interactions between pairs of the process components including interactions between:
the Purchasing Contract Processing process component and the Product Catalogue Authoring process component, where the pair-wise interaction between the Purchasing Contract Processing process component and the Product Catalogue Authoring process component includes transmission of a catalogue update notification message, from the Purchasing Contract Processing process component to the Product Catalogue Authoring process component, requesting that at least one particular catalogue be updated based at least in part on identification of at least one item of modified product data; and the Product Catalogue Authoring process component and the Product Catalogue Publishing process component, where the pair-wise interaction between the Purchasing Contract Processing process component and the Product Catalogue Authoring process component includes transmission of:
- a catalogue publication request message from the Product Catalogue Authoring process component to the Product Catalogue Publishing process component, the catalogue publication request message comprising a request for performance of a publication task on a catalog, and
- a catalogue publication transmission package notification message from the Product Catalogue Publishing process component to the Product Catalogue Authoring process component, the catalogue publication transmission package notification message comprising a notification that a catalogue publication request message has been received at the Product Catalogue Authoring process component, the catalogue publication transmission package notification message further providing information about the validity of content included in the received catalogue publication request message;
- a catalogue publication confirmation message from the Product Catalogue Publishing process component to the Product Catalogue Authoring process component, the catalogue publication confirmation message comprising confirmation from the Product Catalog Publishing process component to the Product Catalog Authoring process component describing whether the publication or deletion of a catalog requested by a catalog publication request message was successful;
- a catalogue publication transmission cancellation request message from the Product Catalogue Authoring process component to the Product Catalogue Publishing process component, the catalogue publication transmission cancellation request message comprising a request for cancellation of transmission of a catalog;
- a catalogue publication transmission cancellation confirmation message from the Product Catalogue Publishing process component to the Product Catalogue Authoring process component, comprising a confirmation of a received catalog publication transmission cancellation request;
- a catalogue item lock request message from the Product Catalogue Authoring process component to the Product Catalogue Publishing process component, the catalogue item lock request message comprising a request to lock items of the catalog contained in a catalog publication transmission;
- a catalogue item lock confirmation message from the Product Catalogue Publishing process component to the Product Catalogue Authoring process component, the catalogue item lock confirmation message comprising a confirmation of a catalogue item lock;
- a catalogue publication transmission content change request message from the Product Catalogue Authoring process component to the Product Catalogue Publishing process component, the catalogue publication transmission content change request message comprising a request to change, create or to delete a limited number of catalog items contained in a catalog publication transmission; and
- a catalogue publication transmission content change confirmation message from the Product Catalogue Publishing process component to the Product Catalogue Authoring process component, the catalogue publication transmission content change confirmation message comprising a confirmation from Product Catalogue Publishing to Product Catalogue Authoring regarding whether a limited number of catalog items contained in the catalog publication transmission could be changed, created or deleted in response to a received catalogue publication transmission content change request message.

12. The system of claim 11, wherein:
each of the process components includes one or more business objects; and
none of the business objects of any one of the process components interacts directly with any of the business objects included in any of the other process components.

13. The system of claim 11, wherein:
none of the business objects included in any one of the process components is included in any of the other process components.

14. The system of claim 11, wherein:
a plurality of process agents, each process agent being either an inbound process agent or an outbound process agent, each inbound process agent being operable to receive a message from an inbound operation, each outbound process agent being operable to cause an outbound operation to send a message, and each process agent being associated with exactly one process component.

15. The system of claim 11, the system comprising multiple hardware platforms, wherein:
the Purchasing Contract Processing process component is deployed on a first hardware platform;
the Product Catalogue Authoring process component is deployed on a second hardware platform; and
the Product Catalogue Publishing process component is deployed on a third hardware platform.

16. The system of claim 15, wherein each of the first through the third hardware platforms are distinct and separate from each other.

* * * * *